United States Patent
Huddar

(10) Patent No.: US 12,341,647 B2
(45) Date of Patent: Jun. 24, 2025

(54) DETECTING HARDWARE ISSUE

(71) Applicant: DISH Network Technologies India Private Limited, Karnataka (IN)

(72) Inventor: Lohit Huddar, Bengaluru (IN)

(73) Assignee: DISH Network Technologies India Private Limited, Bengaluru (IN)

( * ) Notice: Subject to any disclaimer, the term of this patent is extended or adjusted under 35 U.S.C. 154(b) by 0 days.

(21) Appl. No.: 18/624,654

(22) Filed: Apr. 2, 2024

(65) Prior Publication Data

US 2024/0267279 A1    Aug. 8, 2024

Related U.S. Application Data

(63) Continuation of application No. 18/162,302, filed on Jan. 31, 2023, now Pat. No. 11,973,634.

(51) Int. Cl.
    *H04L 41/0631*    (2022.01)
    *H04L 41/0654*    (2022.01)
    *H04L 65/80*      (2022.01)

(52) U.S. Cl.
    CPC ...... *H04L 41/0631* (2013.01); *H04L 41/0654* (2013.01); *H04L 65/80* (2013.01)

(58) Field of Classification Search
    CPC .. H04L 41/0631; H04L 41/0654; H04L 65/80
    See application file for complete search history.

(56) References Cited

U.S. PATENT DOCUMENTS

| | | | | |
|---|---|---|---|---|
| 4,617,555 | A  * | 10/1986 | Sheiman | ............... G08B 1/08 |
| | | | | 367/199 |
| 6,292,918 | B1 * | 9/2001  | Sindhushayana | ..... H04L 1/0051 |
| | | | | 714/755 |
| 6,704,289 | B1   | 3/2004  | D, Souza et al. | |
| 7,630,308 | B1 * | 12/2009 | Loher | ................. H04L 65/80 |
| | | | | 370/230.1 |
| 8,159,960 | B2   | 4/2012  | Cooppan | |
| 9,473,266 | B1 * | 10/2016 | Patapoutian | ........ H03M 13/616 |
| 9,654,527 | B1   | 5/2017  | Narayanan et al. | |

(Continued)

FOREIGN PATENT DOCUMENTS

| | | | | |
|---|---|---|---|---|
| JP | 2012015658 A * | 1/2012 | | |
| WO | WO-9630841 A1 * | 10/1996 | ........... H04L 1/1685 |
| WO | 2009012701 | 1/2009 | | |

*Primary Examiner* — Oanh Duong
(74) *Attorney, Agent, or Firm* — Kilpatrick Townsend & Stockton LLP

(57) ABSTRACT

A computer-implemented method carried out by a client media device is provided. In one example, the method includes launching a streaming media interface application in response to user input received at the client media device, transmitting a request over a communications network to a streaming media server for a video stream requested by the user input, optimizing an ABR of the client media device based on a network bandwidth to obtain an optimized ABR setting for playing the video stream, playing the video stream at the optimized ABR setting, monitoring continuously streaming quality of the video stream, detecting a streaming quality issue of the video stream, identifying a hardware issue of the client media device as a cause of the streaming quality issue, and automatically performing at least one attempt to fix the hardware issue when the hardware issue is present.

20 Claims, 8 Drawing Sheets

(56) References Cited

U.S. PATENT DOCUMENTS

| | | |
|---|---|---|
| 10,267,912 B1* | 4/2019 | Birkenes .............. G10K 11/341 |
| 11,973,634 B1 | 4/2024 | Huddar |
| 2012/0306990 A1 | 12/2012 | Ben-zedeff et al. |
| 2013/0058238 A1 | 3/2013 | Ansari et al. |
| 2015/0215365 A1 | 7/2015 | Shaffer et al. |
| 2015/0373074 A1* | 12/2015 | Lohmar ................ H04L 65/762 709/219 |
| 2015/0381315 A1* | 12/2015 | Thomson .......... H03M 13/3761 714/776 |
| 2016/0365123 A1* | 12/2016 | Wang ............... G11B 20/10527 |
| 2020/0012399 A1* | 1/2020 | Brillon ................ G11B 27/105 |
| 2020/0081773 A1* | 3/2020 | Hanham ........... H03M 13/2906 |
| 2020/0099981 A1 | 3/2020 | Zhang et al. |
| 2020/0322667 A1 | 10/2020 | Eluvan et al. |
| 2020/0351698 A1* | 11/2020 | Li ........................ H04W 24/02 |
| 2021/0075442 A1* | 3/2021 | Myung ............. H03M 13/1102 |
| 2021/0294791 A1* | 9/2021 | Narayanaswamy ........................ G06F 11/2635 |
| 2021/0407612 A1* | 12/2021 | Subbarao ............ G11C 11/5635 |
| 2022/0200630 A1* | 6/2022 | Kale ................. G06F 11/1068 |
| 2022/0417084 A1 | 12/2022 | Mishra |
| 2023/0011660 A1 | 1/2023 | Eluvan et al. |
| 2023/0123256 A1 | 4/2023 | Mishra et al. |
| 2023/0161653 A1* | 5/2023 | Kim ........................ G06N 3/04 714/1 |

\* cited by examiner

DETECTING HARDWARE ISSUE

BACKGROUND OF THE DISCLOSURE

This application is a continuation of U.S. Non-Provisional patent application Ser. No. 18/162,302, filed on Jan. 31, 2023, which is incorporated by reference for all purposes.

BACKGROUND OF THE DISCLOSURE

The present disclosure generally relates to systems and methods for video streaming, and more particularly to techniques for automatically monitoring streaming quality and detecting hardware issues during the presentation of media content.

Recently, an increasingly popular approach for video-on-demand (VoD) applications is the adoption of adaptive bit rate (ABR) video streaming techniques. In ABR video streaming, each source video content is encoded/transcoded into multiple variants (or streams) of different bitrates and resolutions in the video stream preparation stage. The video streams are divided into time segments and each of the streams are stored in a video hosting server. When a client watches the video content on a client media device, the client media device can adaptively select one of the many streams for each time segment based on network bandwidth, buffer size, playback speed, etc. The adaptive video streaming framework puts the burden at the server side due to increased CPU power for repeated encoding/transcoding demand and increased storage space to store many streams of the same content. It also allows to serve users of varying connections to the network without changing the overall infrastructure, with the potential to provide the best possible service to each individual user on a moment-by-moment basis.

The streaming quality of the ABR video stream is important because it has direct impact the viewer's quality-of-experience (QoE). Although the streaming quality of the ABR video stream normally depends on the network bandwidth; however, performance of the hardware components of the client media device can also significantly affect the streaming quality. In spite of normal network bandwidth, vital hardware issues (e.g., hardware defect, malfunction, or failure) may be present unbeknownst to the user. Such hardware issues, if not timely detected and identified, may cause serious streaming quality issues and undermine viewer's QoE.

BRIEF SUMMARY OF THE DISCLOSURE

In accordance with some embodiments of the present disclosure, a system is provided. The system includes a client media device, a streaming media server, and a communications network. The client media device includes one or more electronic processors, a machine-readable storage medium in electronic communication with the one or more electronic processors, instructions stored in the machine-readable storage medium and executable by the one or more electronic processors to cause the system to launch a streaming media interface application executed on the client media device in response to user input received at the client media device; transmit a request over the communications network to the streaming media server for a video stream requested by the user input, optimize an ABR of the client media device based on a network bandwidth of the communications network to obtain an optimized ABR setting for playing the video stream, play the video stream at the optimized ABR setting; monitor continuously streaming quality of the video stream, detect a streaming quality issue of the video stream, identify a hardware issue of the client media device as a cause of the streaming quality issue, and in response to the identified hardware issue, automatically perform at least one attempt to fix the hardware issue when the hardware issue is present.

In accordance with some embodiments of the present disclosure, a computer-implemented method carried out by a client media device is provided. The method includes launching a streaming media interface application executed on the client media device in response to user input received at the client media device, transmitting a request over a communications network to a streaming media server for a video stream requested by the user input, optimizing an ABR of the client media device based on a network bandwidth of the communications network to obtain an optimized ABR setting for playing the video stream; playing the video stream on the client media device at the optimized ABR setting, monitoring continuously streaming quality of the video stream; detecting a streaming quality issue of the video stream, identifying a hardware issue of the client media device as a cause of the streaming quality issue, and in response to the identified hardware issue, automatically performing at least one attempt to fix the hardware issue when the hardware issue is present.

In accordance with some embodiments, the present disclosure provides a non-transitory machine-readable storage medium encoded with instructions, the instructions executable to cause one or more electronic processors of a client media device platform operations of a method. The method includes launching a streaming media interface application executed on the client media device in response to user input received at the client media device, transmitting a request over a communications network to a streaming media server for a video stream requested by the user input, optimizing an ABR of the client media device based on a network bandwidth of the communications network to obtain an optimized ABR setting for playing the video stream; playing the video stream on the client media device at the optimized ABR setting; monitoring continuously streaming quality of the video stream, detecting a streaming quality issue of the video stream, identifying a hardware issue of the client media device as a cause of the streaming quality issue, and in response to the identified hardware issue, automatically performing at least one attempt to fix the hardware issue when the hardware issue is present.

BRIEF DESCRIPTION OF THE DRAWINGS

Exemplary embodiments will hereinafter be described in conjunction with the following drawing figures, and like numerals denote like elements, and.

DETAILED DESCRIPTION OF THE DISCLOSURE

Figure 1A:
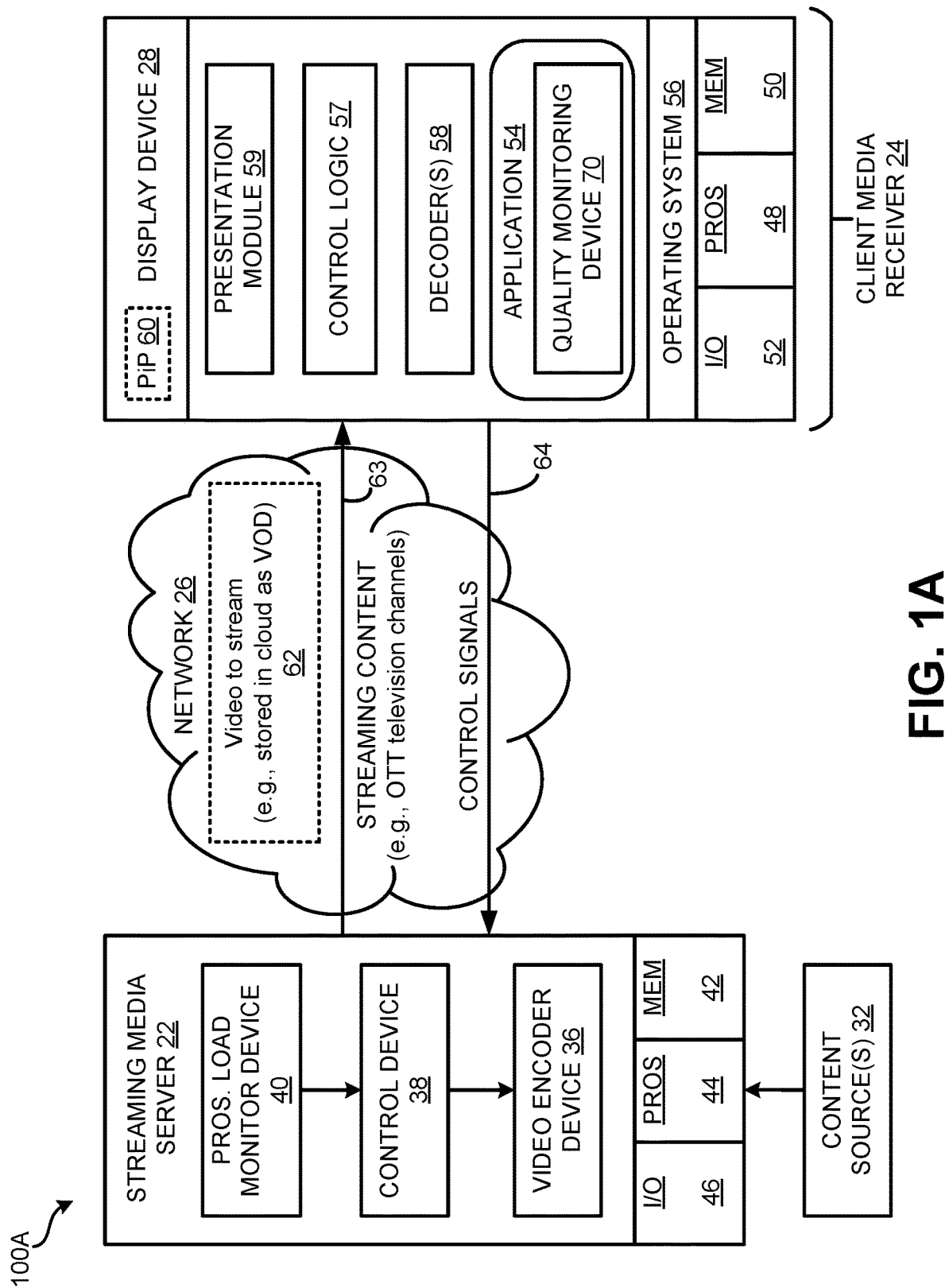
FIG. 1A is a schematic diagram illustrating an example system for presenting content of a streaming video session to a user in accordance with some embodiments.

The following Detailed Description is merely exemplary in nature and is not intended to limit the scope of the present disclosure or the application and uses of the teachings of the present disclosure.

In an ABR video streaming environment, a higher streaming bit rate generally correlates to a greater streaming quality, while a lower streaming bit rate generally correlates to a lower streaming quality. Further, a higher streaming bit rate equates to an increased relative size of the data stream, while a lower streaming bit rate equates to a decreased relative size of the data stream. Hence, a higher quality stream requires more network bandwidth and greater data throughput of the client device to ensure continuous, uninterrupted media playback on the client device. Similarly, a lower quality stream requires less network bandwidth and less data throughput of the client device to ensure continuous, uninterrupted media playback on the client device.

However, even at an optimized ABR rate, users may sometimes experience poor streaming quality or unsatisfied QoE, potentially due to other issues unrelated to the network bandwidth. In particular, when a hardware component becomes overworked, overheated, defective, malfunctions, or fails, the streaming quality will be significantly undermined. If such a hardware issue is not timely detected or determined, the poor streaming quality may persist despite the proper function of ABR optimization and sufficient bandwidth resources. Further, detecting and resolving the hardware issue usually require manual efforts, which can be time consuming and challenging for the average user. Thus, there is a need for automatic detection of hardware issues that cause the streaming quality problems.

According to some embodiments of the present disclosure, a novel computer-implemented method is provided. The method advantageously allows for efficient and effective detection of a hardware issue of a client media device during streaming a video stream on the client media device. The method could be used to monitor the streaming quality of the video stream being played on the client media device, detecting a streaming quality issue, identify the root cause of the streaming quality issue, and determine the presence or absence of a hardware issue as the root cause of the streaming quality issue.

As used herein, "media content," "media program," "multimedia content," "content," or variants thereof should be understood as referring to any audiovisual programming or content in any streaming, file-based, or another format. The media content generally includes data that, when processed by a media player or decoder, allows the media player or decoder to present a visual and/or audio representation of the corresponding program content to a viewer (i.e., the user of a client media device including the media player or decoder). In one or more embodiments, a media player can be realized as a piece of software that plays multimedia content (e.g., displays video and plays audio).

FIG. 1A schematically illustrates an example streaming media system 100A. The streaming media system 100A includes a streaming media server 22 and a client media device 24. The streaming media server 22 is suitable for applying adaptive bit rate (ABR) during a streaming video session established between the streaming media server 22 and at least one client media device 24. As depicted in FIG. 1A, streaming media server 22 and, more broadly, streaming media system 100A are provided as generalized examples and should not be construed as limiting in any respect. In addition to streaming media server 22 and client media device 24, streaming media system 100A further includes a communications network 26 over which streaming video sessions are conducted. Communications network 26 may encompass any number of digital or other networks enabling bidirectional signal communication between the streaming media server 22 and client media device 24 utilizing common protocols and signaling schemes. In this regard, communications network 26 can include one or more open content delivery networks (CDNs), Virtual Private Networks (VPNs), Local Area Networks (LANs), Wide Area Networks (WANs), the Internet, and various other communications networks implemented in accordance with TCP/IP protocol architectures, User Datagram Protocol (UPD) architectures, or other communication protocols. In embodiments, communications network 26 may also encompass a cellular network and/or any other public or private networks.

During a given streaming video session, the streaming media server 22 encodes, packetizes, and transmits streaming video content over communications network 26 to client media device 24. The streaming video content will typically, but need not necessarily include accompanying audio content. As the content is received, client media device 24 decrypts (if needed) and decodes the streaming video content (also referred to as a "video stream," a "video-containing media stream", or a "media stream" herein). Client media device 24 utilizes the newly-decoded content to generate corresponding video output signals, which are supplied to display device 28 for viewing by the client media device 24. The video output signals may be transmitted within a single electronic device or system when client media device 24 and display device 28 are combined as a unitary device, such as a smartphone, laptop computer, tablet computer, wearable device, or smart television (that is, a television containing an integrated media receiver). In other embodiments in which display device 28 is realized as an independent electronic device separate and apart from client media device 24, such as a freestanding television set or monitor, client media device 24 may output the video output signals as wired or wireless transmission, which is then forwarded to display device 28.

In some embodiments, streaming media server 22 may encode, packetize, and transmit a single video stream during the streaming video session. In other instances, and as indicated in FIG. 1A, streaming media server 22 may concurrently transmit multiple video-containing media streams as, for example, a streaming channel bundle provided pursuant to an Over-the-Top (OTT) television service. In still other embodiments, streaming media server 22 may concurrently provide separate video streams to multiple client media devices 24; e.g., as may occur when the streaming media server 22 assumes the form of a consumer place-shifting device, which provides streaming content to multiple client devices (e.g., smartphones, tablets, televisions, or the like) located within a user's residence or similar area. Regardless of the number of streaming channels or video streams provided by the streaming media server 22 to client media device 24 during a given streaming video session, the streaming video content can be obtained from any number and type of content sources 32 in communication with or included within streaming media server 22. Content sources 32 can include, for example, content providers and aggregators external to streaming media server 22 and in communication with the streaming media server 22 over communications network 26. In some embodiments, content sources 32 can include any number and type of storage mediums accessible to streaming media server 22 (e.g., contained within or operably coupled to the streaming media server 22) in which the video content subject to streaming is stored.

As appearing herein, the term "streaming media server" is defined broadly to encompass any device or group of operably-interconnected devices capable of encoding video content at an ABR value, which is repeatedly adjusted in response to variations in processor load (and other factors) in the manner described herein. In the illustrated embodiment, streaming media server 22 includes at least one video encoder device 36, which operates under the command of at least one control device 38. Additionally, streaming media server 22 also includes a processor load monitoring device 40. While generically illustrated as a separate device in FIG. 1A, the processor load monitoring device 40 can be combined with the control device 38 in some embodiments. Devices 36, 38, 40 can be implemented utilizing any combination of hardware and software (including firmware) components. For example, devices 36, 38, 40 may be implemented utilizing software or firmware embodied by code or computer-readable instructions residing within memory 42 and executed by at least one processor 44 (e.g., a CPU) further included in the streaming media server 22. As illustrated, memory 42 generally depicts the various storage areas or mediums (computer-readable storage mediums) contained in streaming media server 22 and may encompass any number and type of discrete memory sectors. In some embodiments, processor 44 may be a microprocessor, which is realized along with other non-illustrated components included in the streaming media server 22 as a system-on-a-chip. Finally, it will be appreciated that streaming media server 22 may contain various other components known in the art including, for example, any number and type of Input/Output (I/O) feature 46 enabling bidirectional communication with client media device 24 and, perhaps, other nodes or devices over the communications network 26.

In accordance with other embodiments of the present disclosure, client media device 24 can assume various different forms, including, but not limited to that of a mobile phone, a wearable device, a tablet, a laptop computer, a desktop computer, a gaming console, a digital video recorder (DVR), or a set up box (STB). When engaged in a video streaming session with streaming media server 22, client media device 24 generates video signals for presentation on a display device 28. As indicated above, the display device 28 can be integrated into client media device 24 as a unitary system or electronic device. This may be the case when client media device 24 assumes the form of a mobile phone, tablet, laptop computer, a smart television, or similar electronic device having a dedicated display screen. In one embodiment, the display device 28 can assume the form of an independent device, such as a freestanding monitor or television set, which is connected to client media device 24, such as a gaming console, DVR, STB, or another peripheral device, utilizing a wired or wireless connection. In such embodiments, the video output signals may be formatted in accordance with conventionally known standards, such as S-video, High Definition Multimedia Interface ("HDMI"), Sony/Philips Display Interface Format ("SPDIF"), Digital Video Interface ("DVI"), or Institute of Electrical and Electronics Engineers (IEEE) 1394 standards.

By way of non-limiting illustration, client media device 24 is shown as including at least one processor 48 configured to selectively execute software instructions, in conjunction with associated memory 50 and I/O features 52. I/O features 52 can include a network interface, an interface to mass storage, an interface to display device 28, and/or various types of user input interfaces. Client media device 24 may execute a software program or application 54 directing the hardware features of client media device 24 to perform the functions described herein. Application 54 suitably interfaces with processor 48, memory 50, and I/O features 52 via any conventional operating system 56 to provide such functionalities. The software application can include a place-shifting application in embodiments where streaming media server 22 assumes the form of an STB, DVR, or similar electronic device having place-shifting capabilities and typically located within a user's residence. In some embodiments, client media device 24 may be implemented with special-purpose hardware or software, such as the SLINGCATCHER-brand products available from Sling Media Inc., currently headquartered in Foster City, Calif., and/or any other products.

With continued reference to FIG. 1A, application 54 suitably includes control logic 57 adapted to process user input, receive streaming content 63 of the video stream from streaming media server 22, decode the received streaming content, and provide corresponding output signals to display device 28 in the above-described manner. Application 54 decodes the streaming content of video stream utilizing at least one decoder 58, which may be implemented as specialized hardware or software executing on processor 48 in some embodiments. The decoded content is supplied to presentation device 59, which generates corresponding output signals transmitted to display device 28. In some embodiments, presentation device 59 may also combine decoded programming to create a blended or composite image, for example, one or more picture-in-picture (PIP) images 60 may be superimposed over a primary image generated on display device 28.

In operation, control logic 57 of client media device 24 obtains programming in response to end user input received at I/O features 52 of the client media device 24. Control logic 57 may establish a control connection with the streaming media server 22 via communications network 26 enabling the transmission of commands from the control logic 57 to the control device 38. Streaming media server 22 may operate by responding to commands received from a client media device 24 via the communications network 26, as illustrated in FIG. 1A by control commands 64. Such commands may include information utilized to initiate a streaming video session, such as a place-shifting or OTT television session, with the streaming media server 22 possibly including data supporting mutual authentication of the streaming media server 22 and the client media device 24. When the streaming media server 22 assumes the form of a consumer place-shifting device, such as a STB or DVR located in a user's residence, control commands 64 may include instructions to remotely operate the place-shifting device, including to initiate and to change channels during an OTT session. Such commands may also be received at the client media device 24 and forwarded to the streaming media server 22, as appropriate, as a user navigates and otherwise interacts with the GUI of the streaming media interface application 54 executing on the client media device 24.

Upon user request for initiation of a streaming video session, the client media device 24 determines an appropriate ABR value or setting at which to request a variant stream of the user-selected video stream to be received at the client media device 24 and presented on the display device 28. The streaming media interface application 54 can utilize a default ABR value or setting in selecting bit rate of the video stream. The default ABR value may be specified in a master playlist accessed by the client media device 24, with the default rate pre-defined in some manner. For example, the default ABR value may be the bit rate of a variant playlist that is first listed or "on top" of a set in the master playlist. In other embodiments, the default ABR value utilized to initiate streaming may be selected as the lowest or highest quality stream available, with the client media device 24 actively varying stream quality during the ensuing media streaming session as appropriate. The bit rate of the video stream can be optimized by the client media device 24 under current network conditions (e.g., bandwidth), as monitored on a real-time or near real-time basis.

The application 54 further includes a quality monitoring device 70 executable on the client media device to cause the processor 48 to perform the methods according to the present disclosure. In some embodiments, the quality monitoring device 70 functions to monitor the streaming quality of the media streaming session presented on the client media device 24 and detect a streaming quality issue related to the media streaming session, identify the root cause of the streaming quality, determine presence or absence of a hardware issue, and attempt to fix the hardware issue. More examples of the function of the quality monitoring device 70 will be described with references to FIG. 2 through FIG. 7 below.

To establish a streaming video session, streaming media server 22 receives an initial transmission from client media device 24 via the communications network 26. This initial transmission may include data identifying the content desirably streamed to client media device 24 and other information, such as data supporting authentication of the streaming media server 22 and client media device 24. Additionally, in embodiments where streaming media server 22 assumes the form of a consumer place-shifting device, such as an STB or DVR located in the residence of an end-user, control commands or signals 62 may include instructions to remotely operate the place-shifting device, as appropriate. A streaming video session then ensues until termination by the streaming media server 22 or client media device 24.

Figure 1B:
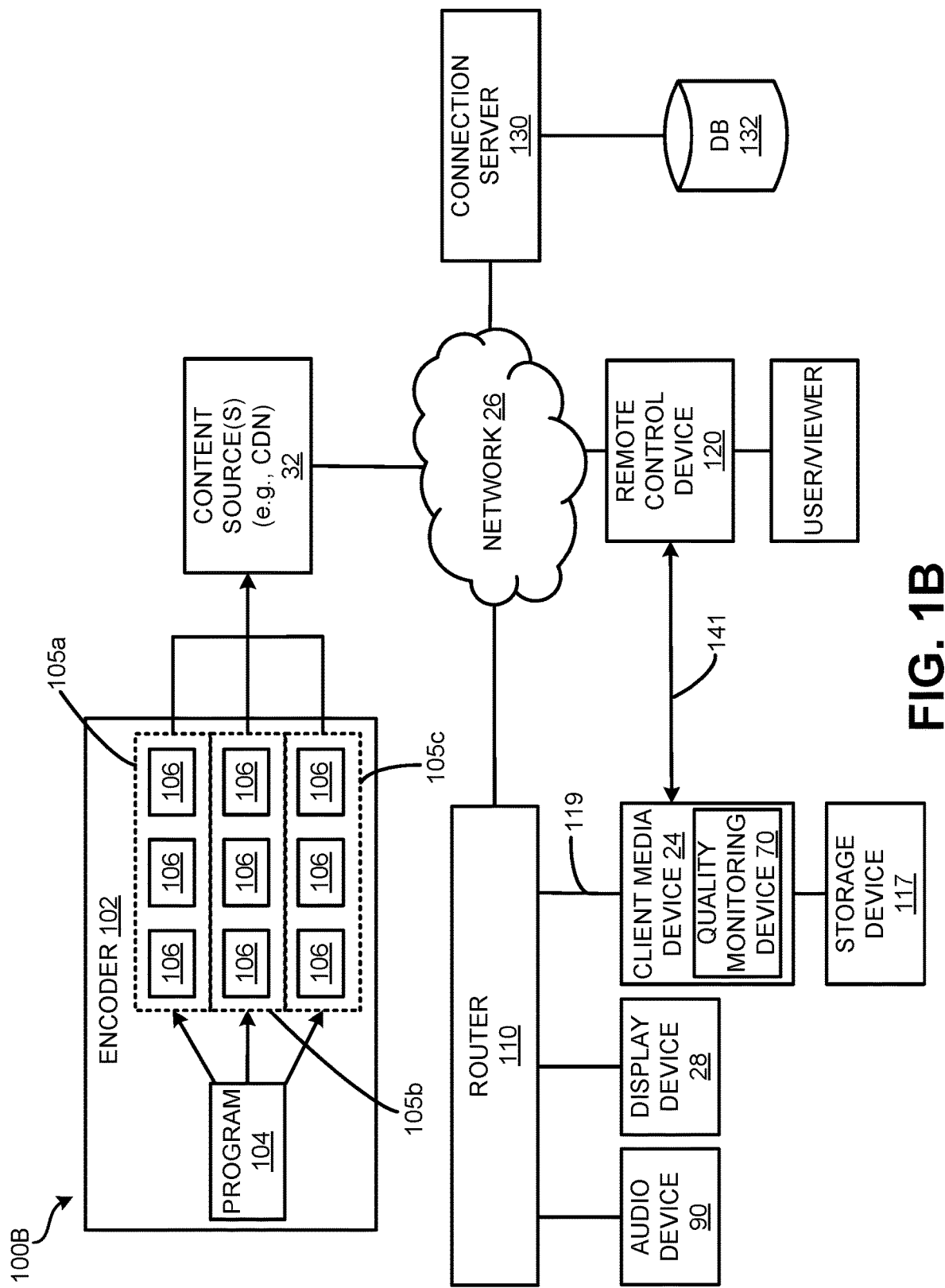
FIG. 1B is a schematic diagram illustrating an example system for ABR video streaming in accordance with some embodiments.

FIG. 1B is a schematic diagram illustrating another example system 100B to for ABR video streaming. The system 100B is a close variation of the system 100A of FIG. 1A and may contain the same or similar components of the system 100A. In the illustrated example, the system 100B includes encoder 102 (e.g., the video encoder device 36 of FIG. 1), content source(s) 32, router 110, client media device, display device 28, audio device 90, storage device 117, remote-control device 120, connection server 130, database 132, and the communications network 26.

In the illustrated example of FIG. 1B, the remote-control device 120 is controlled by a user and is wirelessly connected to the client media. The remote-control device 120 may generate a user input for a user-selected video stream and initially attempt to obtain the user-selected media stream directly from the content source 32. The remote-control device 120 also establishes a connection 141 with the client media device 24 (e.g., an STB or other home device) that is associated with the same user as the remote-control device 120. This connection 141 may be facilitated by a connection server 130 operating as a service on network 125, as explained more fully below. After the connection 141 is established, then the client media device 24 is able to communicate with the content source 32 and function as an intermediary for obtaining segments 106 of the adaptive stream from the content source 107 and for forwarding the obtained segments 106 to the client media device 24.

The various components of system 100B may be deployed under the control of different entities. In some embodiments, encoder 102, content source 32 and connection server 130 are jointly operated by a content distributor such as a cable television operator, a direct broadcast satellite (DBS) service provider, broadcast network, or the like. Such a distributor would typically support multiple customers, each with their own client media devices 24 and remote-control device 120. Other embodiments could separate the encoding, distributing and operating functions between different parties. A television network or other content producer could provide already-encoded media streams, for example, which could be made available via a commercially-available CDN or other server while a distributor or other party maintains control of the system 100B via connection server 130.

In some embodiments, client media device 24 includes (or at least communicates with) a storage device 117 such as a hard disk drive, memory, or the like. Storage device 117 may be used in implementing a personal video recorder (PVR), for example, that stores received programming for later viewing. Storage device 117 may also be used for caching media segments that may not have been requested by the remote-control device 120 in some embodiments, as described below.

The client media device 24 generally operates on a home network 119, such as a local area network (LAN) behind a router 110 or similar device. Typically, router 110 provides a firewall that blocks undesired traffic from the communications network 26 while allowing outgoing traffic from home network 119. Home network 119 may also include local media players or other client devices such as display device 28 and audio device 90 for receiving and presenting the content of the adaptive media streams, as desired.

Adaptive media streams may be created and distributed in any manner. As shown in FIG. 1B, encoder 102 is any device or service capable of encoding media programs 104 into one or more adaptive streams 105A-C. Encoder 102 may be, for example, a digital computer system that is programmed to create multiple streams 105A-C each representing a media program 104 in its entirety, but with different bit rates, frame rates, resolution and/or other levels of quality. Typically, each stream 105A-C is made up of smaller segments 106 that each represent a small portion of the program content with a single data file. Each stream 105A-C is typically encoded so that segments 106 of the different streams 105A-C are interchangeable with each other, often using a common timing index. This allows a client media player to mix and match segments 106 from different streams 105A-C to create a media stream that effectively adapts as network conditions or other conditions change. Other embodiments could use different encoding structures or techniques, as desired.

The sets of segments 106 making up each media stream 105 are stored on a CDN or other content source 32 for distribution on the Internet or another the communications network 26. Typically, a media player application (e.g., the application 54 of FIG. 1A) executing on the client media device 24 contains intelligent logic to select appropriate segments 106 as needed to obtain and playback the media program 104. As noted above, segments 106 may be interchangeable between media streams 105 so that higher quality segments 106 may be seamlessly intermixed with lower quality segments 106 to reflect changing network or other conditions in delivery over network 125. In some embodiments, the media player 124 initially obtains a digest or other description of the available segments 106 so that the player itself can select and request the particular segments 106 that are desired. Since the segments 106 are typically stored as separate files, segment requests may take the form of conventional hypertext transport protocol (HTTP) constructs (e.g., HTTP "get" instructions) or the like. Such constructs are readily routable on the communications network 26 and can be served by conventional CDN or other web-type servers no, and may provide a convenient mechanism for distributing adaptive media streams to the client media device on the communications network 26.

In various embodiments, a connection server 130 is provided to locate the user's client media device 24 on the communications network 26. To that end, connection server 130 is a computerized service that facilitates connection 141 among the client media device 24, the remote-control device 120, and the content source 32. In many embodiments, connection server 130 executes on a conventional server or other digital computer that includes a processor, memory, input/output interfaces (e.g., an interface to the communications network 26), and/or the like. Equivalent embodiments could implement some or all of connection server 130 using cloud-based computing resources or the like.

Connection server 130 typically operates in conjunction with a database 132 that associates customers or other users with their particular client media devices 24, and that maintains a current network address that can be used to contact the client media device 24. Database 132 may additionally or alternately contain other information, such as information about the type, location or address of the client media device 24, as desired.

Figure 2:
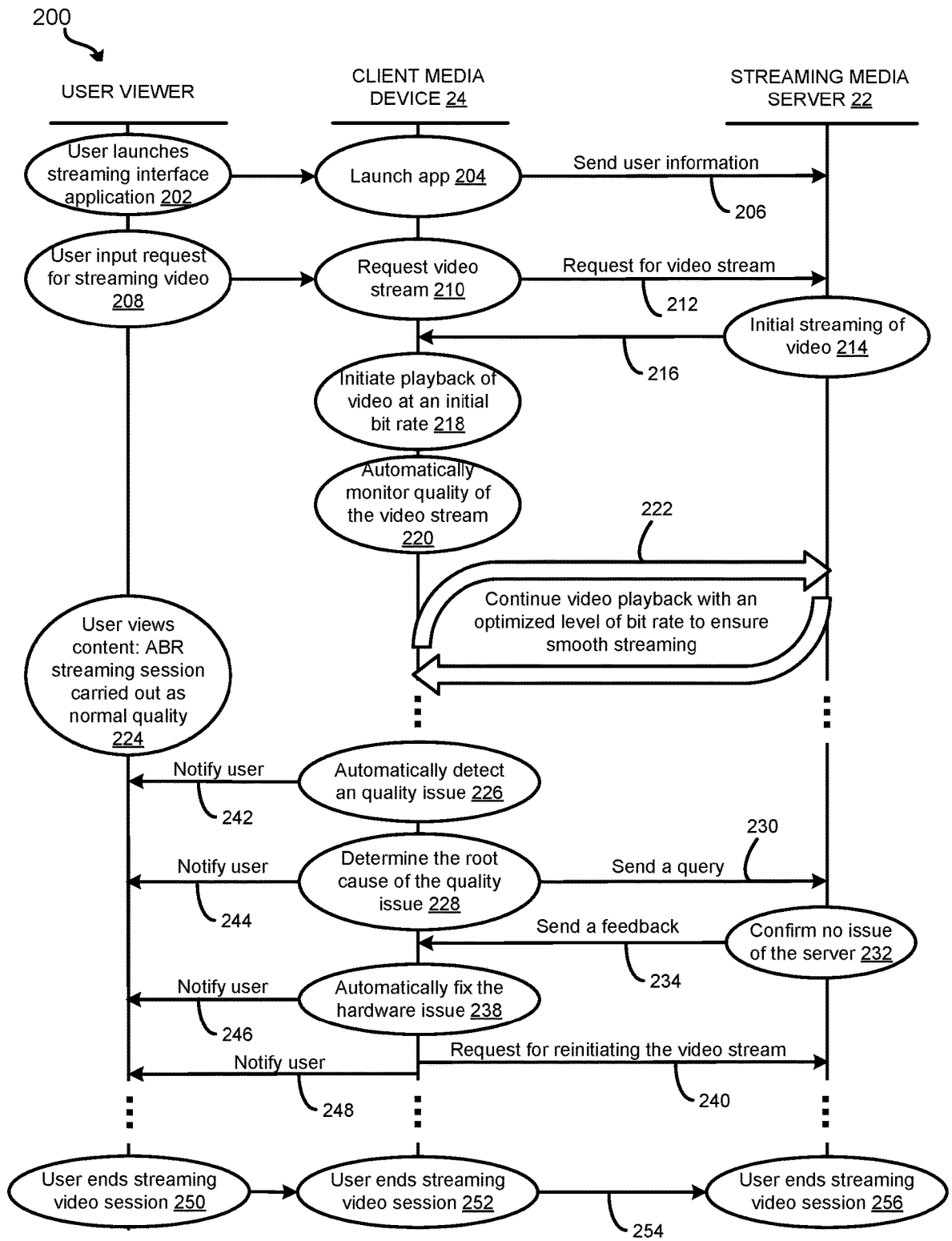
FIG. 2 is a message flow diagram illustrating an exemplary process for detecting a hardware issue of the client media device illustrated in FIG. 1A and FIG. 1B in accordance with some embodiments.

FIG. 2 is a message flow diagram of a process 200, as illustrated in accordance with an exemplary embodiment of the present disclosure. Process 200 commences when client media device 24 recognizes a likely intent on behalf of an end user to initiate a streaming video session in a near or imminent future timeframe. For example, client media device 24 may initiate process 200 in response to the launch of a streaming media interface application 54, such as an OTT streaming application (FUNCTION 202). Streaming media interface application may be launched in response to user request received at client media device 24. Such a user request can be entered by an end user into client media device 24 utilizing a user input interface (e.g., a keyboard, pointer device, touchscreen, scroll wheel, voice command system, remote control, etc.) included within I/O features 52 (FIG. 1A) or otherwise operably coupled to client media device 24. Client media device 24 responds accordingly (FUNCTION 204) by launching the streaming media interface application. Substantially concurrently, client media device transmits user information and a request (TRANSMISSION 206) to the streaming media server 22 (FIG. 1A) for user authentication. Upon receiving the user information and the request for user authentication, the streaming media server 22 may perform user authentication to authenticate or authorize the user. One way or two-way user authentication processes can be performed, as desired.

The user may enter a user input to select one or more particular video streams and a request for initiating a streaming video session of the user-selected video stream (e.g., playing content of the user-selected video stream in a media player executed on the client media device 24). Upon receipt of the user request, client media device 24 transmit a request for the user-selected video stream (TRANSMISSION 212) to the streaming media server 22. In response, the streaming media server 22 establishes a connection with client media device 24 and initiates streaming of the user-selected video stream (FUNCTION 241, TRANSMISSION 216) at an initial bit rate or ABR value.

The video streamed to client media device 24 in response to the request included in TRANSMISSION 212 can assume various forms. In some embodiments, selected live content can be requested and received from streaming media server 22 specific to the end user presently operating the client media device 24; e.g., content can be loaded from the user's live channels catalog stored by the streaming media interface application. In one embodiment, the sample video can be a generalized or universal media stream; e.g., a video-on-demand (VOD) file published in CDN, as indicated in FIG. 1A by signal 62. As a still further possibility, client media device 24 may request content from a default streaming OTT channel for usage as the video stream. In this latter regard, a streaming OTT channel identified as a favorite (e.g., most frequently watched) of the end user or the last-viewed streaming OTT channel during the previous streaming session in which the end user engaged can be utilized as the video stream. In this manner, if a user should request to view the particular streaming OTT channel already provided to client media device 24 as the video stream, client media device 24 may simply transition from hiding or obscuring the video content and accompanying audio content (e.g., by playing the content in a hidden player layer or view on mute) to now presenting the video content and audio content in an unobscured, unmuted manner; e.g., by bringing the hidden player layer forward and deactivating mute mode.

During streaming the user-selected video stream on the client media device 24, the quality monitoring device 70 (FIG. 1A) of the application 54 executed on the client media device 24 may automatically and continuously monitor the streaming quality of the on-going user-selected video. As mentioned above, the quality monitoring device 70 can monitor the streaming bit rate and frame rate of the streaming (FUNCTION 218) and determine if the bit rate or frame rate is beyond an acceptable range or below a pre-determined threshold level indicative of unstable or disrupted streaming performance. In some embodiments, the quality monitoring device 70 can determine if the video stream meets a threshold level of smoothness or continuity according to common user apprehension or experience.

Advancing next to FUNCTION 220 shown in FIG. 2, the video stream is played with ABR variations at normal streaming quality during process 200 until such time as a user request for another selected streaming content is entered into the client media device 24 (e.g., via application 54) or another termination event occurs. The ABR variations can be applied in essentially the same manner as is carried-out in typical streaming techniques to allow the user to view the content of the user-selected video stream played on the client media device 24 (FUNCTION 224).

The quality monitoring device 70 can automatically detect a streaming quality issue (FUNCTION 226) during the monitoring of the streaming quality. As mentioned above, the streaming quality issue may be detected and identified by an indication of unstable or unqualified performance of the streaming by comparison with a pre-established standard. In one example, the quality monitoring device 70 can identify an abnormal streaming bit rate by comparing the measured streaming bit rate against a pre-established standard of streaming bit rate, and determine the occurrence of a streaming quality issue when the measured streaming bit rate is below the pre-established standard for a pre-determined period of time (e.g., 1-10 seconds). Similarly, the quality monitoring device 70 can also identify an abnormal frame rate by comparing the measured frame rate against a pre-established standard of frame rate, and determine the occurrence of a streaming quality issue when the measured frame rate is below the pre-established standard for a pre-determined period of time (e.g., 1-10 seconds). In another example, the quality monitoring device 70 identify an abnormal streaming smoothness by measuring the number of occurrences of lag or disruption of streaming and comparing the measured number against a pre-established standard, and determine the occurrence of a streaming quality issue when the measured number of lag is below the pre-established standard for a pre-determined period of time (e.g., 1-10 seconds). Likewise, the quality monitoring device 70 can identify a streaming quality issue by an indication of continuous buffering, video freezing, stuck loading, or other phenomena that negatively affect the QoE for common users. In some embodiments, the quality monitoring device 70 can further verify the streaming quality issue once it is determined, for example, by indication of a continuous presence or repetition of the determined streaming quality issue within a period of time. The client media device may notify the user of the detected streaming quality issue (TRANSMISSION 242) by a prompt message, an alert, or a warning.

Once a streaming quality issue related to the streaming of the user-selected video stream is detected, determined, and verified, the quality monitoring device 70 can proceed to determine the root cause of the streaming quality issue (FUNCTION 228) and determine whether the streaming quality issue is caused by a hardware issue. The quality monitoring device 70 can perform at least one check on the network, bandwidth, software application, streaming media server, and content provider to exclude any external issues and non-hardware issues. In some embodiments, the quality monitoring device 70 performs a check on the network (e.g., by transmitting a query to the communications network 26 of FIG. 1A) to determine whether the network connection is stable and whether the network functions properly. Upon receiving positive feedback from the communications network 26 indicating the proper function of the network, the quality monitoring device 70 can exclude any issue with the network as the root cause of the streaming quality issue. In some embodiments, the quality monitoring device 70 can measure the network bandwidth of the network and check whether the network bandwidth is sufficient to support a desired minimal streaming quality. When the network bandwidth is within a normal range, the quality monitoring device 70 can exclude any issue with the network bandwidth as the root cause of the streaming quality issue. In some embodiments, the quality monitoring device 70 can send a query (TRANSMISSION 230) to the streaming media server 22 to determine whether the streaming media server 22 and content sources providing the user-selected vide stream function properly. The streaming media server 22 can confirm no issue with itself (FUNCTION 232) and transmit positive feedback (TRANSMISSION 234) back to the client media device 24. Upon receiving the positive feedback indicating the proper function of the streaming media server 22 and the content sources, the quality monitoring device 70 can exclude any external issue with the streaming media server 22 as the root cause of the streaming quality issue.

When any external or non-hardware issues are excluded, the quality monitoring device 70 can determine whether the streaming quality issue is caused by a hardware issue of the client media device 24. The quality monitoring device 70 can perform at least one check on the hardware components of the client media device 24 to identify the specific hardware issue. As mentioned above, typical hardware components of the client media device 24 (FIG. 1A) include but are not limited to the processor 48, the memory 50, the decoder(s) 58, the network adaptor, the router 110, the display device 28, the audio device 90, and so on. In some embodiments, the quality monitoring device 70 performs a check on the temperature of the processor 48 and compare the measured temperature against a pre-determined threshold temperature. When the measured temperature is above the threshold temperature for a period of time, an overheated processor is present and indicative of a hardware malfunction or failure. Likewise, the quality monitoring device 70 can perform a check on the decoder to determine the presence or absence of a decoder issue (e.g., whether the processor(s) embedded in the decoder has malfunction or failure). The presence and duration of the decoder issue is also indicative of a hardware malfunction or failure leading to the streaming quality issue. The quality monitoring device 70 may also perform a check on the memory of the client media device 24 to determine the presence or absence of an abnormal memory capacity or whether the available memory capacity is below a pre-determined threshold level (e.g., whether the memory is full or nearly full). The presence or duration of the abnormal memory capacity is indicative of a hardware issue. The client media device 24 may notify the user of the root cause of the streaming quality issue (TRANSMISSION 244).

When the presence of a hardware issue is determined to be the root cause of the streaming quality issue, the quality monitoring device 70 can automatically perform one or more attempts to fix the hardware issue. In some embodiments, the quality monitoring device 70 performs at least one of: performing one or more times of memory clearance of the memory 50; performing one or more times of reset of the decoder 58; performing one or more times of reboot of the client media device 24; performing one or more times of reboot of the router 110, performing one or more times or reboot of the display device 28; performing one or more times of reboot of the audio device 90. In some embodiments, the quality monitoring device 70 automatically performs the one or more attempts to fix the hardware issue without user intervention. In some embodiments, the quality monitoring device 70 can sequentially perform a series of attempts to fix the identified hardware issue, the series of attempts including a pre-determined number of attempts (e.g., a first attempt, a second attempt, a third attempt, etc.)

In some embodiments, once the first attempt to fix the hardware issue is performed, the client media device 24 can request (TRANSMISSION 240) to reinitiate the user-selected video stream (e.g., initiating a new video streaming session, or resuming the last video streaming session). The quality monitoring device 70 can determine whether the hardware issue is successfully fixed by repeating FUNCTION 226, FUNCTION 228, and FUNCTION 238. If the streaming quality issue persists after the first attempt, the quality monitoring device 70 can perform additional attempt(s) to fix the hardware issue. In some embodiments, the quality monitoring device 70 may instruct the client media device 24 to wait for a period of time (e.g., from 1 second to 60 seconds) before performing the additional attempts. The period of time before a given attempt in the series of attempts may be longer than that of the preceding attempt. As an example, the hardware issue persists after a first reboot of the client media device 24 is performed. The client media device 24 is instructed to wait for about 5 seconds before a second reboot is performed. When the hardware issue is still present after the second reboot, the client media device 24 is instructed to wait for about 10 seconds before a third reboot is performed. When the hardware issue is still present after the third reboot, the client media device 24 is instructed to wait for about 20 seconds before a third reboot is performed. The same process is repeated until five reboots (e.g., a maximum number that is pre-determined) are performed. When the hardware issue is still present after the maximum number of attempts is reached, a permanent hardware issue beyond recovery or requiring professional repair is indicated. When the presence of a permanent or persistent hardware issue is determined, the client media device may notify the user (TRANSMISSION 246) that the permanent or persistent hardware issue is beyond normal recovery.

Finally, when the end user ultimately chooses to conclude the current streaming video session (FUNCTION 92), client media device 24 may engage in the appropriate shutdown or termination process (FUNCTION 94). In embodiments in which the client media device 24 utilizes the last-viewed streaming OTT channel as the sample video, client media device 24 may store the identity of the last-viewed streaming OTT channel in cache or memory. Client media device 24 then transmits a termination command to streaming media server 22 (TRANSMISSION 96), streaming media server 22 then terminates the current streaming session (FUNCTION 98), and process 200 concludes.

Figure 3:
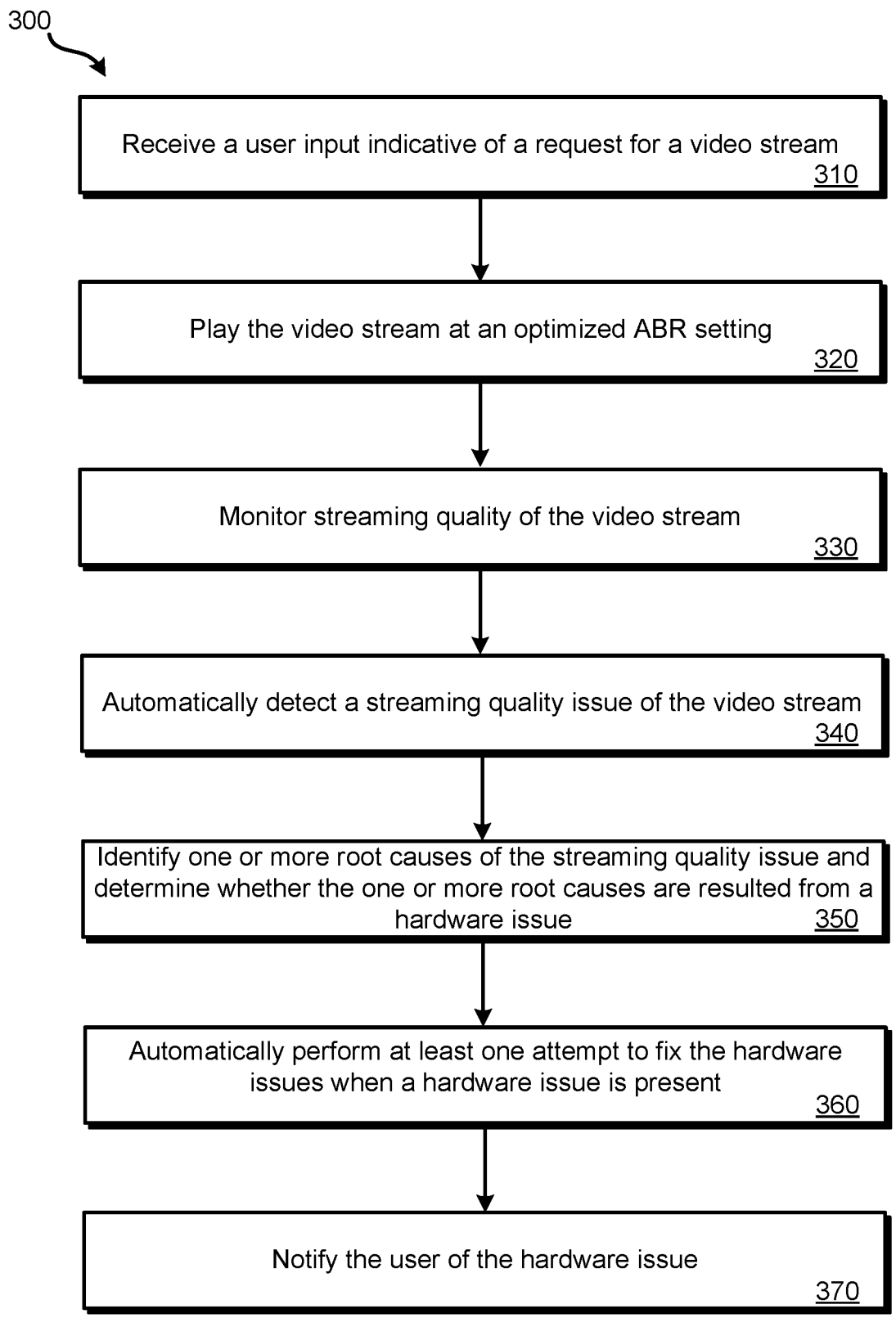
FIG. 3 is a flow diagram of an exemplary method for detecting a hardware issue of the client media device of FIG. 1A and FIG. 1B in accordance with some embodiments.

FIG. 3 is a flow diagram illustrating an example method 300 of detecting a streaming quality issue of streaming a video stream on a client media device (also referred to as "a client media receiver," "a client media receiver device," or "a client device") shown in FIG. 1A, FIG. 1B, and FIG. 2, according to some embodiments. At 310, a user input indicative of a request for a user-selected video stream is received on a client media device. At 320, the user-selected video stream is played or streamed, on the client media device, at an optimized ABR setting. In some embodiments, the streaming of the user-selected video stream is initiated at an initial ABR rate, and the optimized ABR rate is obtained by optimization based on the bandwidth of the network and potentially the processor speed of the client media device. For example, the ABR setting may be optimized by: (1) segmenting video content into small fragments of varying bit rates and resolutions, arranged onto an "ABR encoding ladder," (e.g., a series of bit rate values corresponding to defined resolutions) (2) gauging the estimated available bandwidth for a user during video playback, and (3) switching video quality dynamically depending on the content being delivered and how much bandwidth a user has at any given moment as well as network conditions.

At 330, the streaming quality of the user-selected video stream is continuously and automatically monitored by the quality monitoring device of the software application executed on the client media device. As mentioned above, the streaming bit rate and frame rate of the streaming can be monitored to determine if the bit rate or frame rate is below a pre-determined threshold level indicative of unstable or disruptive streaming and unsatisfied streaming performance. An unsatisfied streaming performance may also be indicated by the failure of the video stream to meet a threshold level of smoothness or continuity according to a common-accepted standard of quality of experience (QoE).

At 340, the presence of a streaming quality issue is automatically detected and determined by the quality monitoring device. As mentioned above, the streaming quality issue may be at least one of: an abnormal bit rate, an abnormal frame rate, an abnormal streaming smoothness or continuity, an unacceptable frequency of lag, continuous buffering, video freezing, stuck loading, and so on.

At 350, one or more root causes of the streaming quality issue are identified by the quality monitoring device. In some embodiments, a process is performed by the quality monitoring device to exclude any external issue, software issue, or non-hardware issue. The process includes at least one of: performing a check on the network to verify that the network performs properly and exclude any issue with the network; performing a check on the connection server to verify that the internet connection is proper and to exclude any issue with the internet connection; performing a check on the network bandwidth to verify that the network bandwidth is normal and sufficient; performing a check on the streaming media server and the content sources providing the content of the user-selected video stream to verify that the streaming media server and content sources function properly and to exclude any issue with the streaming media server and content sources. In some embodiments, a process for detecting a hardware issue is performed by the quality monitoring device to determine whether the one or more root causes are resulted from a hardware issue of the client media device and to identify the hardware issue.

At 360, at least one attempt to fix the hardware issue is automatically performed by the quality monitoring device of the client media device when the presence of a hardware issue is determined to cause the streaming quality issue. At 370, a notification about the hardware issue is sent to the user by the client media device. More examples of the process for detecting and handling a hardware issue are illustrated in FIG. 4 through FIG. 7.

Figure 4:
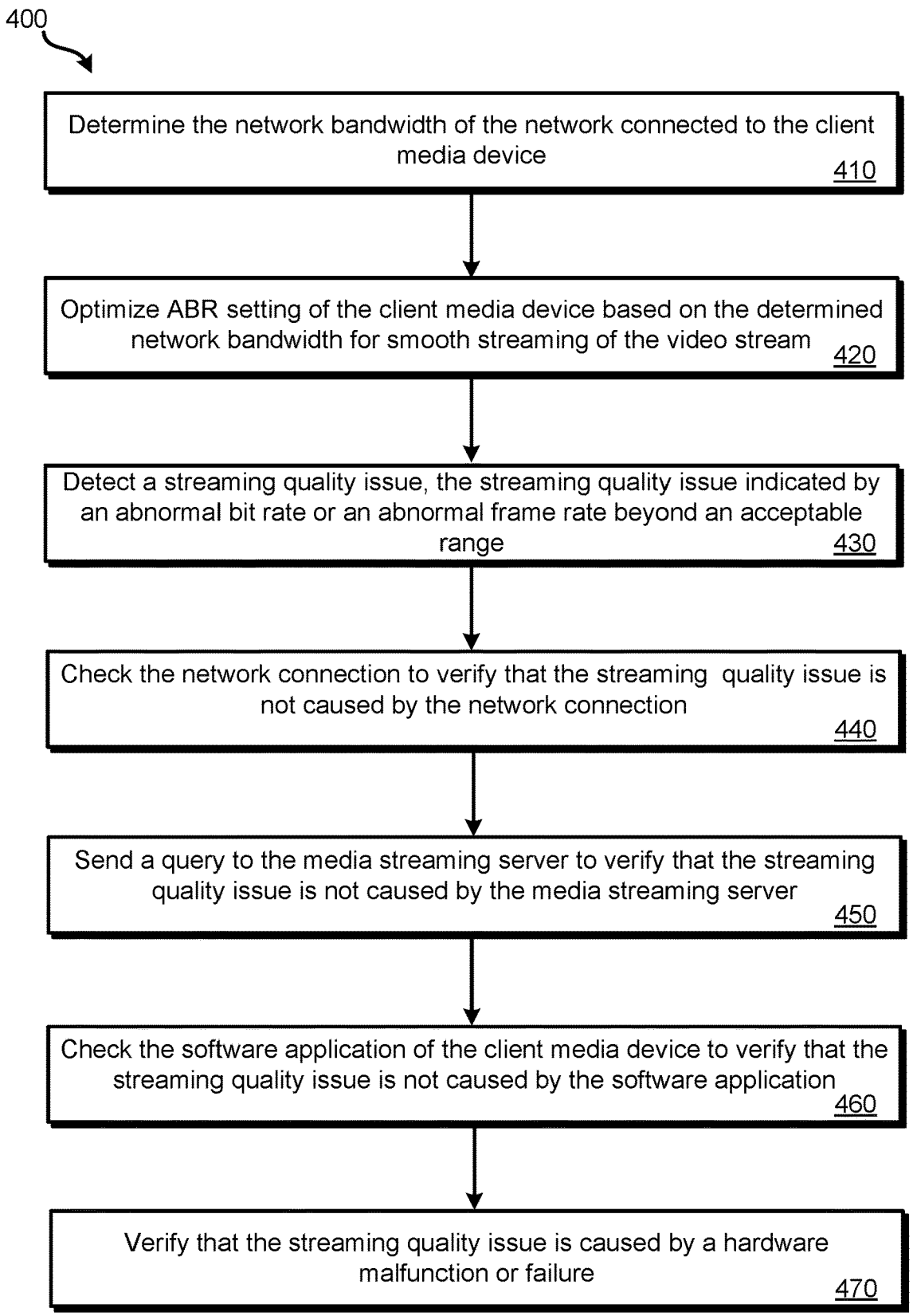
FIG. 4 is a flow diagram of an exemplary method for detecting a hardware issue of the client media device of FIG. 1A and FIG. 1B in accordance with some embodiments.

FIG. 4 is a flow diagram illustrating an example method 400 for detecting and determining a hardware issue of the client media device. The method 400 may include one or more steps that are similar or equivalent to the steps of method 300 shown in FIG. 3. At 410, the network bandwidth of the communications network connected to the client media device is determined by the client media device. In one embodiment, the processor speed of the client media device is also determined. At 420, the ABR setting of the client media device on which the user-selected video stream is playing is optimized based on the determined network bandwidth and the processor speed.

At 430, a streaming quality issue is automatically detected by the quality monitoring device of the client media device. As mentioned above, the streaming quality issue may be indicated by an abnormal bit rate, abnormal frame rate, abnormal streaming smoothness, continuous buffering, and so on. At 440, a check on the network connection is performed to verify that the streaming quality issue is not caused by the network connection. At 450, a query is sent to the media streaming server to verify that the streaming quality issue is not caused by the media streaming server. At 460, a check on the application of the client media device is performed to verify that the streaming quality issue is not caused by any error of the software application. Additional steps may be performed to further exclude any external issue, software issue, or non-hardware issue. At 470, presence of one or more hardware issues is verified to be the root cause of the streaming quality issue.

Figure 5:
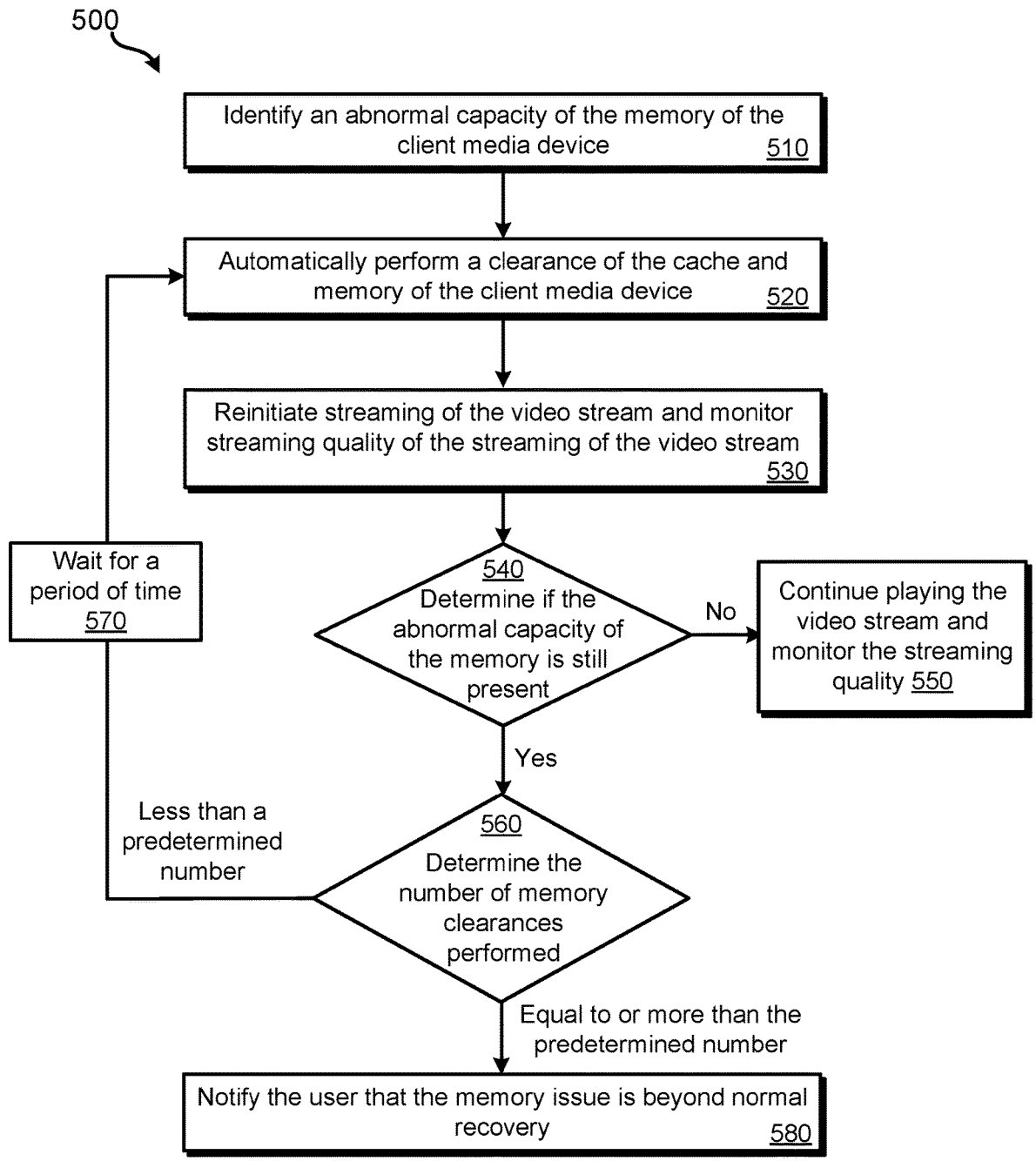
FIG. 5 is a flow diagram of an exemplary method for detecting and fixing a hardware issue of the client media device of FIG. 1A and FIG. 1B in accordance with some embodiments.

FIG. 5 is a flow diagram illustrating an example method 500 for handling a hardware issue (memory issue) of the client media device. At 510, an abnormal memory capacity of the client media device is identified as the hardware issue causing the streaming quality issue of the user-selected video stream. At 520, a first clearance of the cache and memory of the client media device is automatically performed as a first attempt to fix the memory issue. At 530, the streaming of the user-selected video stream is reinitiated (e.g., a new video streaming session is initiated). In one embodiment, the user-selected video stream of the previous video streaming session is resumed. The streaming quality of the user-selected video stream is monitored by the quality monitoring device.

At 540, a determination on the presence or absence of the abnormal memory capacity after the first memory clearance is made. If it is determined that the abnormal memory capacity is no longer present, the ongoing streaming the user-selected video stream (the current video streaming session) is continued on the client media device at 550. On the other hand, if it is determined that the abnormal memory capacity is still present after the first memory clearance, the method 500 proceeds to 560, where a determination on the total number of memory clearances that have been performed is made. If the total number of the memory clearances that have been performed is less than a predetermined number (a maximum number allowed, e.g., 3 times, 4, times, 5 times, etc.), the method 500 proceeds to 520 and repeat 520, 530, 540, and 550. On the other hand, if the total number of the memory clearances that have been performed is equal to or more than the predetermined number, the method 500 proceeds to 580, where the client media device ceases performing additional memory clearance and notifies the user that a permanent or persistent hardware issue is present and beyond normal recovery.

In some embodiments, the client media device is allowed to wait for a period of time at 570 before each of the additional memory clearances is performed at 520. The period of time may be gradually increased after each additional memory clearance. For example, the client media device is allowed to wait for 10 seconds before the second memory clearance is performed; to wait for 20 seconds before the third memory clearance is performed; to wait for 30 seconds before the fourth memory clearance is performed; to wait for 60 seconds before the fifth memory clearance, and so on.

Figure 6:
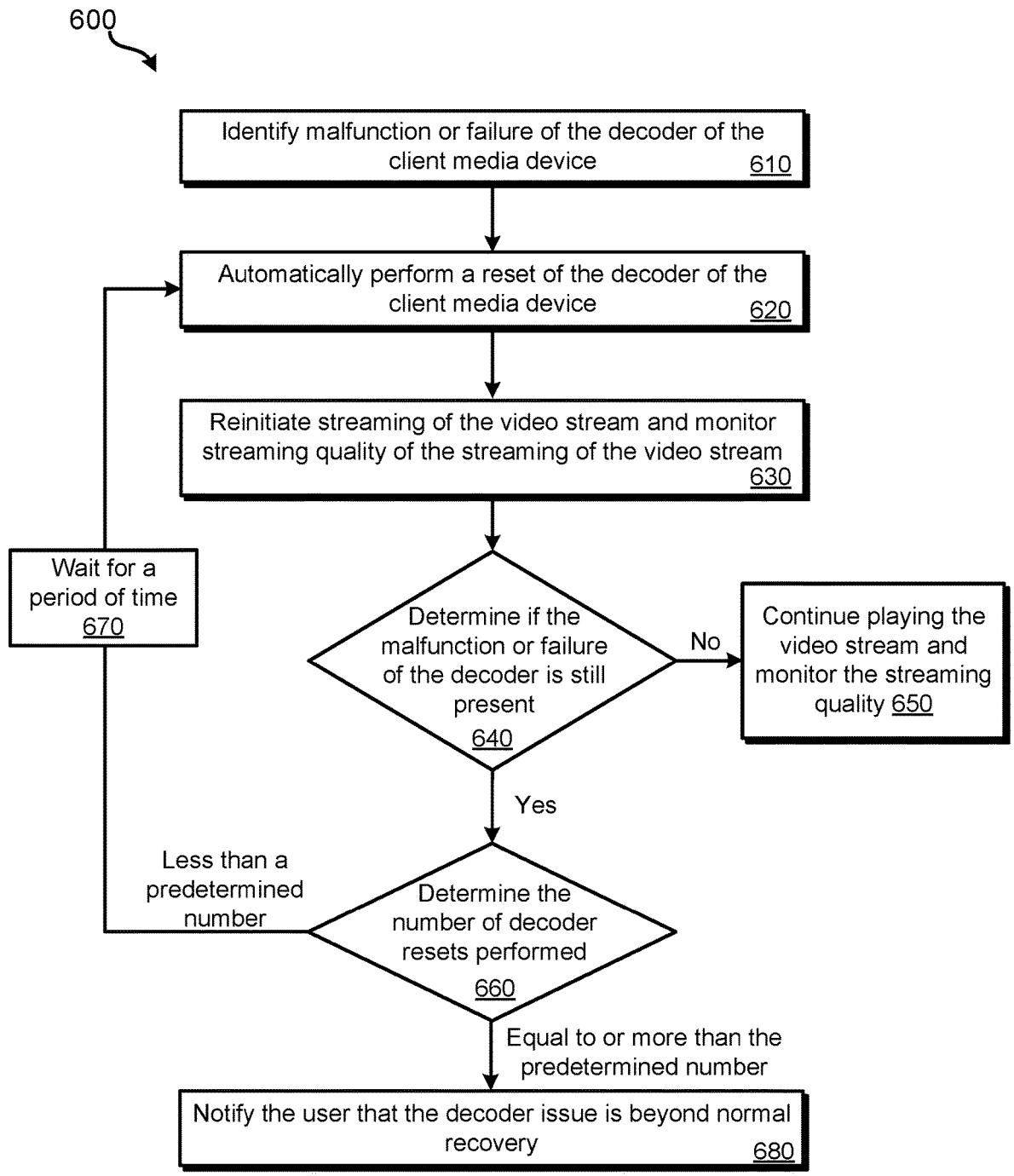
FIG. 6 is a flow diagram of an exemplary method for detecting and fixing a hardware issue of the client media device of FIG. 1A and FIG. 1B in accordance with some embodiments.

FIG. 6 is a flow diagram illustrating an example method 600 for handling a hardware issue (decoder issue) of the client media device. At 610, a malefaction or failure of the decoder of the client media device is identified as the hardware issue causing the streaming quality issue of the user-selected video stream. At 620, the decoder of the client media device is automatically reset as a first attempt to fix the decoder issue. At 630, the streaming of the user-selected video stream is reinitiated (e.g., a new video streaming session is initiated). In one embodiment, the user-selected video stream of the previous video streaming session is resumed. The streaming quality of the user-selected video stream is monitored by the quality monitoring device.

At 640, a determination of the presence or absence of the decoder issue after the first decoder reset is performed. If it is determined that the decoder issue is no longer present, the ongoing streaming of the user-selected video stream (the current video streaming session) is continued on the client media device at 650. On the other hand, if it is determined that the decoder issue is still present after the first decoder reset, the method 600 proceeds to 660, where a determination on the total number of decoder resets that have been performed is made. If the total number of the decoder resets that have been performed is less than a predetermined number (a maximum number allowed, e.g., 3 times, 4, times, 5 times, etc.), the method 600 proceeds to 620 and repeat 620, 630, 640, and 650. On the other hand, if the total number of the decoder resets that have been performed is equal to or more than the predetermined number, the method 600 proceeds to 680, where the client media device ceases performing additional decoder resets and notifies the user that a permanent or persistent hardware issue is present and beyond normal recovery.

In some embodiments, the client media device is allowed to wait for a period of time at 670 before each of the additional decoder resets is performed at 620. The period of time may be gradually increased after each additional decoder reset. For example, the client media device is allowed to wait for 10 seconds before the second decoder reset is performed; to wait for 20 seconds before the third decoder reset is performed; to wait for 30 seconds before the fourth decoder reset is performed; to wait for 60 seconds before the fifth decoder reset, and so on.

Figure 7:
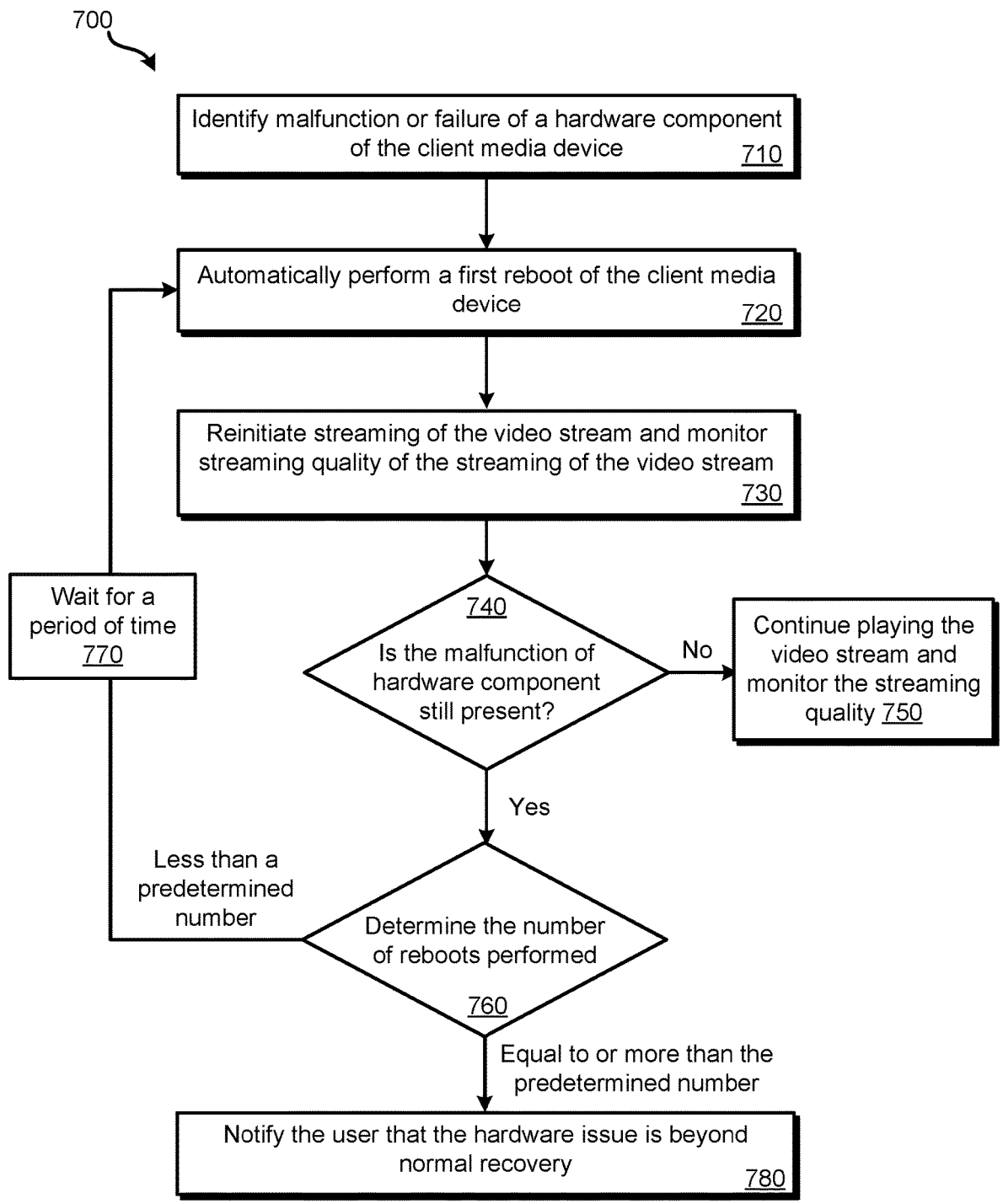
FIG. 7 is a flow diagram of an exemplary method for detecting and fixing a hardware issue of the client media device of FIG. 1A and FIG. 1B in accordance with some embodiments.

FIG. 7 is a flow diagram illustrating an example method 700 for handling a hardware issue (e.g., memory issue, decoder issue, processor issue, display device issue, audio device issue, etc.) of the client media device. At 710, a malefaction or failure of a hardware component of the client media device is identified as the hardware issue causing the streaming quality issue of the user-selected video stream. In some embodiments, an overheated processor is identified by a determination that the measured temperature of the processor of the client media device is beyond a pre-determined temperature range according to a commonly accepted standard. Likewise, a malfunctioned processor of the display device or the audio device may also be identified in a similar manner.

At 720, a reboot of the client media device is automatically performed as a first attempt to fix the hardware issue. In some embodiments, when a hardware issue of the display device is identified, a reboot of the display device may be performed separately. Likewise, when a hardware issue of the audio device is identified, a reboot of the audio device may be performed separately. At 730, the streaming of the user-selected video stream is reinitiated (e.g., a new video streaming session is initiated). In one embodiment, the user-selected video stream of the previous video streaming session is resumed. The streaming quality of the user-selected video stream is monitored by the quality monitoring device.

At 740, a determination on the presence or absence of the identified hardware issue after the first reboot is performed. If it is determined that the identified hardware issue is no longer present, the ongoing streaming the user-selected video stream (the current video streaming session) is continued on the client media device at 750. On the other hand, if it is determined that the identified hardware issue is still present after the first reboot, the method 700 proceeds to 760, where a determination on the total number of reboots that have been performed is made. If the total number of the reboots that have been performed is less than a predetermined number (a maximum number allowed, e.g., 3 times, 4, times, 5 times, etc.), the method 700 proceeds to 720 and repeats 720, 730, 740, and 750. On the other hand, if the total number of the reboots that have been performed is equal to or more than the predetermined number, the method 700 proceeds to 780, where the client media device ceases performing additional reboots and notifies the user that a permanent or persistent hardware issue is present and beyond normal recovery.

In some embodiments, the client media device is allowed to wait for a period of time at 770 before each of the additional reboot is performed at 720. The period of time may be gradually increased after each additional reboot. For example, the client media device is allowed to wait for 10 seconds before the second reboot is performed; to wait for 20 seconds before the third reboot is performed; to wait for 30 seconds before the fourth reboot is performed; to wait for 60 seconds before the fifth reboot, and so on.

It should be noted that the various methods for detecting and handling a hardware issue may be combined and implemented in a sequential or coordinated manner, particularly when multiple hardware issues are identified.

The methods, program products, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to some configurations may be combined in various other configurations. Different embodiments of the configurations may be combined in a similar manner. Also, technology evolves and, thus, many of the elements are examples and do not limit the scope of the disclosure or claims.

Specific details are given in the description to provide a thorough understanding of example configurations (including embodiments). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide an enabling description for implementing described techniques. Various changes may be made in the function and arrangement of elements without departing from the disclosure of the embodiments.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used herein and in the appended claims, the singular forms "a", "an", and "the" include plural references unless the context clearly dictates otherwise. Thus, for example, reference to "a user" includes multiple such users, and reference to "the processor" includes reference to one or more processors and equivalents thereof, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A method carried out by a client media device in communication with a media server via a communications network, the method comprising:
    launching a streaming media interface application in response to an input from a user received at the client media device;
    in response to the input, initiating a video stream and playing the video stream on the client media device;
    detecting a streaming quality issue of the video stream;
    detecting a decoder malfunction of a decoder of the client media device;
    automatically performing at least one decoder reset of the decoder, the at least one decoder reset comprising a first decoder reset and a second decoder reset subsequent to the first decoder reset;
    waiting for a period of time before each one of the at least one decoder reset, the period of time before the second decoder reset being longer than the period of time before the first decoder reset;
    reinitiating the playing of the video stream after each one of the at least one decoder reset;
    determining if the decoder malfunction is still present after each one of the at least one decoder reset;
    determining if a total number of decoder resets that have been performed reaches a pre-determined number; and
    notifying the user of a decoder issue beyond recovery when the decoder malfunction is still present after the total number of decoder resets that have been performed reaches the pre-determined number.

2. The method of claim 1, further comprising:
    optimizing an adaptive bit rate (ABR) of the client media device based on a network bandwidth to obtain an optimized ABR setting for playing the video stream; and
    playing the video stream at the optimized ABR setting.

3. The method of claim 1, further comprising:
    sending a query for an operating status of the media server;
    receiving data indicating the operating status of the media server responsive to the query; and
    determining the media server is not a root cause of the streaming quality issue based on the operating status.

4. The method of claim 1, further comprising:
    detecting a signal strength of a network connection linking the client media device and the communications network; and
    determining if the signal strength is within a pre-determined range, the pre-determined range indicating that the network connection is not a root cause of the streaming quality issue.

5. The method of claim 1, further comprising:
    sending a query for a network bandwidth of the communications network;
    receiving data indicating the network bandwidth to the query; and determining if the network bandwidth based on the received data is within a predetermined range, the pre-determined range indicating that the network bandwidth is not a root cause of the streaming quality issue.

6. The method of claim 1, wherein the streaming quality issue includes at least one of: abnormal bit rate, abnormal frame rate, abnormal streaming smoothness, unacceptable streaming lag, continuous buffering, video freezing, and stuck loading.

7. The method of claim 1, wherein the period of time before each one of the at least one decoder reset is from 1 second to 30 seconds.

8. The method of claim 1, further comprising detecting presence or absence of a hardware malfunction of a hardware component of the client media device, wherein the hardware component comprises at least one of: a processor, a network adaptor, a display device, and an audio device.

9. The method of claim 8, further comprising:
in response to the presence of a hardware malfunction, automatically performing at least one reboot of the client media device;
reinitiating the playing of the video stream after each one of the at least one reboot;
determining if the hardware issue is still present after each one of the at least one reboot;
determining if a total number of reboots that have been performed reaches a pre-determined number; and
notifying the user of a hardware issue of the client media device beyond recovery when the hardware malfunction is still present after the total number of reboots that have been performed reaches the pre-determined number.

10. The method of claim 9, further comprising waiting for a period of time before each one of the at least one reboot.

11. A method carried out by a client media device in communication with a media server via a communications network, the method comprising:
launching a streaming media interface application in response to input from a user received at the client media device;
in response to the input, initiating a video stream and playing the video stream on the client media device;
detecting a streaming quality issue of the video stream;
detecting a hardware malfunction of a hardware component of the client media device, wherein the hardware component comprises at least one of: a processor, a network adaptor, a display device, and an audio device;
automatically performing at least one reboot of the client media device, the at least one reboot comprising a first reboot and a second reboot subsequent to the first reboot;
waiting for a period of time before each one of the at least one reboot, the period of time before the second reboot being longer than the period of time before the first reboot;
reinitiating the playing of the video stream after each one of the at least one reboot;
determining if the hardware malfunction is still present after each one of the at least one reboot;
determining if a total number of reboots that have been performed reaches a pre-determined number; and
notifying the user of a hardware issue of the client media device beyond recovery when the hardware malfunction is still present after the total number of reboots that have been performed reaches the pre-determined number.

12. The method of claim 11, further comprising:
optimizing an adaptive bit rate (ABR) of the client media device based on a network bandwidth to obtain an optimized ABR setting for playing the video stream; and
playing the video stream at the optimized ABR setting.

13. The method of claim 11, further comprising:
sending a query for an operating status of the media server;
receiving data indicating the operating status of the media server responsive to the query; and
determining the media server is not a root cause of the streaming quality issue based on the operating status.

14. The method of claim 11, further comprising:
detecting a signal strength of a network connection linking the client media device and the communications network; and
determining if the signal strength is within a pre-determined range, the pre-determined range indicating that the network connection is not a root cause of the streaming quality issue.

15. The method of claim 11, further comprising:
sending a query for a network bandwidth of the communications network;
receiving data indicating the network bandwidth to the query; and
determining if the network bandwidth based on the received data is within a predetermined range, the pre-determined range indicating that the network bandwidth is not a root cause of the streaming quality issue.

16. The method of claim 11, wherein the streaming quality issue includes at least one of: abnormal bit rate, abnormal frame rate, abnormal streaming smoothness, unacceptable streaming lag, continuous buffering, video freezing, and stuck loading.

17. The method of claim 11, further comprising detecting presence or absence of a decoder malfunction of a decoder of the client media device.

18. The method of claim 17, further comprising:
in response to the presence of a decoder malfunction, automatically performing at least one decoder reset of the decoder of the client media device;
reinitiating the playing of the video stream after each one of the at least one decoder reset;
determining if the decoder malfunction is still present after each one of the at least one decoder reset;
determining if a total number of decoder resets that have been performed reaches a pre-determined number; and
notifying the user of a decoder issue beyond recovery when the decoder malfunction is still present after the total number of decoder resets that have been performed reaches the pre-determined number.

19. The method of claim 18, further comprising waiting for a period of time before each one of the at least one decoder reset, wherein the period of time before each one of the at least one decoder reset is from 1 second to 30 seconds.

20. The method of claim 18, wherein the at least one decoder reset of the decoder comprises a first decoder reset and a second decoder reset subsequent to the first decoder, the period of time before the second decoder reset is longer than the period of time before the first decoder reset.

* * * * *